United States Patent [19]
Genovese

[11] Patent Number: 5,818,507
[45] Date of Patent: Oct. 6, 1998

[54] METHOD AND APPARATUS FOR CONTROLLING THE MODULATION OF LIGHT BEAMS IN A ROTATING POLYGON TYPE IMAGE FORMING APPARATUS

[75] Inventor: Frank Cono Genovese, Fairport, N.Y.

[73] Assignee: Xerox Corporation, Stamford, Conn.

[21] Appl. No.: 330,476

[22] Filed: Oct. 28, 1994

[51] Int. Cl.[6] .............. B41J 2/47; G01D 15/34; G02B 26/00; G02B 27/00
[52] U.S. Cl. .............. 347/261; 347/259; 358/481
[58] Field of Search ................ 347/119, 242, 347/243, 234, 235, 248, 250, 256, 257, 260, 261; 359/18, 197, 200, 209; 358/481, 299

[56] References Cited

U.S. PATENT DOCUMENTS

| | | | |
|---|---|---|---|
| Re. 33,721 | 10/1991 | Sato et al. | 359/198 |
| Re. 33,931 | 5/1992 | Whitney | 347/239 |
| 4,141,620 | 2/1979 | Goshima et al. | 359/200 |
| 4,523,800 | 6/1985 | Yamashita et al. | 359/200 |
| 4,587,531 | 5/1986 | Dangler | 358/481 |
| 4,607,908 | 8/1986 | Ishida et al. | 359/200 |
| 4,623,216 | 11/1986 | Sato et al. | 347/261 |
| 4,694,156 | 9/1987 | Swanberg | 358/481 |
| 4,717,223 | 1/1988 | Ishida et al. | 359/200 |
| 4,726,640 | 2/1988 | Iwama et al. | 359/200 |
| 4,728,983 | 3/1988 | Zwadlo et al. | 347/119 |
| 4,758,058 | 7/1988 | Cato et al. | 359/18 |
| 4,805,972 | 2/1989 | Tanaka et al. | 359/200 |
| 4,934,781 | 6/1990 | Kato et al. | 359/200 |
| 4,934,836 | 6/1990 | Tanaka et al. | 359/200 |
| 4,984,881 | 1/1991 | Osada et al. | 359/198 |
| 5,069,515 | 12/1991 | Itami et al. | 359/200 |
| 5,111,062 | 5/1992 | Hunter et al. | 358/474 |
| 5,164,843 | 11/1992 | Swanberg | 358/481 |
| 5,175,636 | 12/1992 | Swanberg | 358/481 |
| 5,183,350 | 2/1993 | Kramer | 359/198 |
| 5,193,013 | 3/1993 | Swanberg | 358/481 |
| 5,212,570 | 5/1993 | Nacman | 358/481 |
| 5,227,811 | 7/1993 | Kohsaka | 347/259 |
| 5,243,359 | 9/1993 | Fisli | 347/134 |
| 5,291,319 | 3/1994 | Harris | 359/18 |
| 5,299,051 | 3/1994 | Hirano | 359/216 |
| 5,335,108 | 8/1994 | Harris | 359/209 |

FOREIGN PATENT DOCUMENTS 0 550 793 A1  7/1993  European Pat. Off. .

OTHER PUBLICATIONS

Fisli, Tibor, "Compact Optical System for Laser Scanning," *Society of Photo–Optical Instrumentation Engineers*, vol. 390, Jan. 20–21, 1983.

Urbach, John; Fisli, Tibor; Starkweather, Gary, "Laser Scanning for Scanning for Electronic Printing," *Proceedings of the IEEE*, vol. 70, No. 6, Jun. 1982.

*Primary Examiner*—N. Le
*Assistant Examiner*—Raquel Yvette Gordon
*Attorney, Agent, or Firm*—Oliff & Berridge, PLC

[57] ABSTRACT

An apparatus and method for controlling the modulation of an exposing beam of a rotating polygon type image forming apparatus using control marks formed on a rotating surface portion of a polygon member or a motor polygon assembly. The control marks are read by a reader during rotation of the polygon member, and the information read from the control marks is used to control the modulation of the exposing beam of the image forming apparatus to expose evenly spaced, uniformly sized, precisely oriented, geometrically straight scan lines of pixels on a photosensitive member. The control marks can include pixel clock information, intensity correction information, error correction information about individual facets of the polygon member, and motor speed control information.

53 Claims, 9 Drawing Sheets

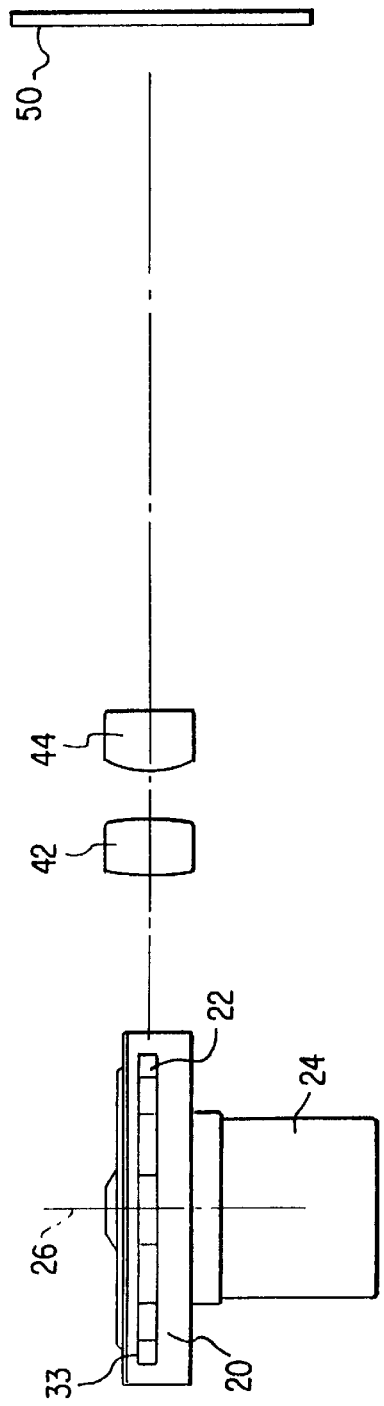
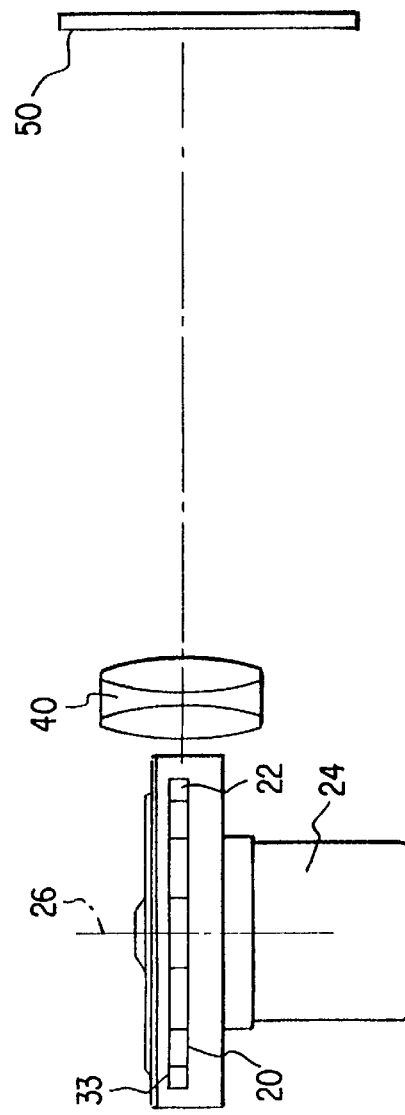

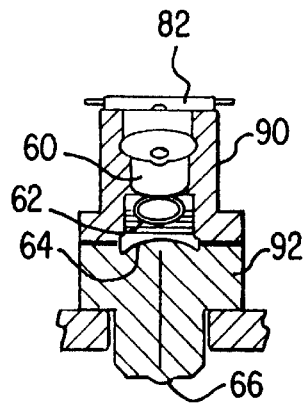 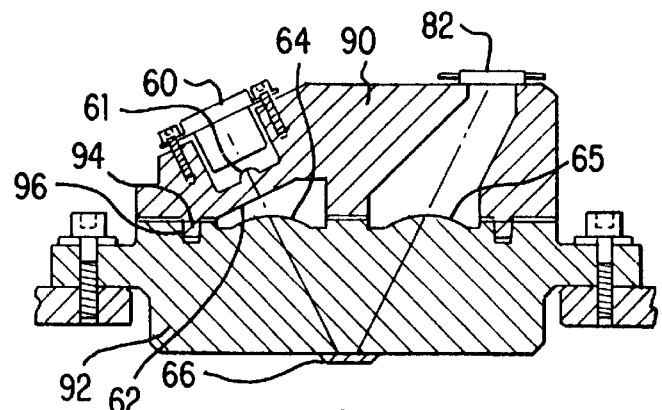
FIG.6A  FIG.6B
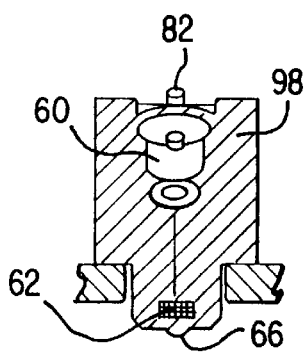 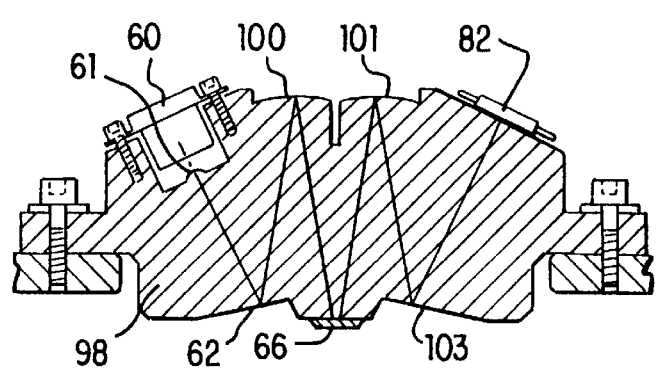
FIG.7A  FIG.7B

METHOD AND APPARATUS FOR CONTROLLING THE MODULATION OF LIGHT BEAMS IN A ROTATING POLYGON TYPE IMAGE FORMING APPARATUS

BACKGROUND OF THE INVENTION

1. Field of the Invention

The invention is related to an image forming apparatus utilizing a multifaceted rotating polygon type scanner. In particular, the invention is related to apparatus and methods for modulating an exposing light beam that is reflected from a rotating polygon member onto a photosensitive member to create an electrostatic latent image on the photosensitive member.

2. Description of Related Art

A typical prior art rotating polygon type image forming apparatus is shown in FIG. 1A. A rotating polygon member 20 is mounted in a motor polygon assembly 24. A light source generates an exposing light beam that is directed at reflective facets 22 of the rotating polygon member 20. As the polygon member 20 rotates, the exposing light beam is reflected from the facets 22 such that it passes through a projection lens set 42, 44 and scans across a photosensitive member 50 in a focussed line. The reflected exposing light beam exposes an electrostatic latent image on the photosensitive member 50. As the polygon member 20 rotates, the exposing light beam is modulated to produce individual bursts of light that expose a line of individual pixels, or dots, on the photosensitive member 50.

Ideally, the image forming apparatus should be capable of exposing a line of evenly spaced, identical pixels on the photosensitive member 50. However, because of the inherent geometry of the projection lens system, and because manufacturing errors can cause imperfections in the facets of a polygon member, obtaining evenly spaced, identical pixels can be problematic.

The speed at which the focussed exposing light beam travels across the photosensitive member 50 is called the spot velocity. In most rotating polygon type image forming systems, the light source is fixed, the photosensitive member 50 is flat, and the polygon member 20 rotates at a constant angular velocity. Without some means to correct for the inherent scan non-linearity caused by the geometry of the system, the spot velocity will vary as the exposing light beam scans across the photosensitive member 50. The spot velocity will be higher towards the ends of the scan line, and lower towards the center of the scan line. A varying spot velocity makes it necessary to adjust the modulation rate of the exposing light beam (turning it on and off at the appropriate times) to expose an evenly spaced line of pixels. A pulse train signal governing the modulation of the exposing light beam to form the pixels is known as the pixel clock signal. If the frequency of the pixel clock signal is constant, the resulting pixels will be positioned further apart at the edges of the photosensitive member 50, and closer together towards the center of the photosensitive member 50.

If the frequency of the pixel clock signal is varied to correct for the varying spot velocity along a scan line, pixels in the center of the scan line will be illuminated for a longer period of time than pixels towards the ends of the scan line. As a result, a proportionately greater amount of light is received by the photosensitive member 50 when pixels are formed toward the center of the photosensitive member, and the size of exposed area of the central pixels becomes slightly larger, or blooms, as a result of the extra exposure. This effect is called exposure smile error.

Various prior art methods have been disclosed for correcting and compensating for the above-mentioned errors in order to expose a scan line of evenly spaced, uniformly sized pixels on the photosensitive member 50. One of the most popular methods is to use a projection lens set, commonly known as an F-Theta design, that employs carefully engineered optical distortion in the lenses 42, 44 to compensate for the inherent non-linearity caused by the geometry of the system.

When the exposing light beam is scanned through the axial portions of the F-Theta lens, it passes through in a relatively straight line. When the exposing light beam scans through the off-axis portions of the F-Theta lenses, however, it's path is distorted, being bent progressively toward the system axis. The further away from the axis of the F-Theta lens, the more pronounced the bending toward the center of the photosensitive member.

When a scanner is equipped with an F-Theta lens design, and the polygon member rotates at a constant angular velocity, the spot velocity will be relatively constant along an entire scan line. Lenses 42 and 44 as shown in FIG. 1A, are a lens set of the compensated F-Theta design yielding a spot position along the scan line linearly proportional to the scan angle itself. With the F-Theta scan lenses, the exposing light beam reflected from the polygon facet is focussed on the photosensitive member 50, and scans along its surface in a nominally straight line at a constant spot velocity.

In a system utilizing the compensated F-Theta lens set 42 and 44, a constant frequency pixel clock signal will cause evenly spaced pixels to be exposed on the photosensitive member. Unfortunately, to meet performance goals, the lens designs almost always require extra spacing between the polygon member and the F-Theta lens set elements 42 and 44, and longer overall projection lengths. This means larger physical components and increased hardware costs.

In a system that uses a variable frequency pixel clock signal to correct for the inherent geometric problems, the frequency of the pixel clock signal is varied proportionately with the instantaneous spot velocity, i.e., a higher frequency at the ends of the scan line than toward the center. In such a system there must be a means for keying the frequency of the pixel clock signal to the position of the exposing beam as it scans across the photosensitive member so that the exposure for each pixel is correctly positioned. This is usually accomplished by employing start-of-scan and end-of-scan sensors at the edges of the photosensitive member. The sensors indicate the point in time at which the scanned light beam crosses onto and off of the photosensitive member, and intermediate beam positions can be inferred.

Although a variable frequency modulation system can be designed to expose pixels on evenly spaced centers along the scan line, as mentioned above, critical applications also require smile error correction, which is usually accomplished by modulating the light beam intensity or exposure duty cycle proportionately with the frequency of the pixel clock signal so that the light exposure amount per pixel is constant. Circuitry for accurately modulating the pixel clock frequency, and light beam intensity, as a function of beam position adds cost and complexity to the system.

In addition to the above mentioned error correction means, modern sophisticated scanner designs have feedback servo loops to minimize variations in the rotational speed of the polygon member. Some scanners also employ calibration tables to compensate for scan line timing jitter caused by small curvature variations in the reflective facets of the polygon member.

An alternative way of solving the above mentioned problems is to employ a precision grating and a second unmodulated laser beam, or "pilot" beam, for precise spot positioning control. In such a system, the pilot beam is scanned through the same optical system as the main imaging light beam, but is arranged to strike an optical scale, or calibrated grating, consisting of alternating transparent and opaque elements. A photodetector is located on the other side of the grating to detect the pilot beam after it passes through the grating. As the pilot beam scans across the precision grating, the light beam is interrupted by the evenly spaced opaque zones and prevented from reaching the photodetector. A signal output by the photodetector defines a "pre-distorted" pixel clock signal that provides the desired geometry corrections for the main exposing light beam. When carefully designed, distortions in the two light beams from all causes cancel such that an evenly spaced line of pixels is exposed on the photosensitive member.

An image forming apparatus with a pilot light beam and an optical grating is significantly more expensive and more complex than the other systems described above. In addition, there are other residual geometric errors in scanning systems, such as scan line wobble, skew, and bow, that are not addressed by this technique.

SUMMARY OF THE INVENTION

It is an object of the present invention to provide an inexpensive, simplified method of controlling the modulation of the exposing light beam of a rotating polygon type image forming apparatus to expose a line of evenly spaced, uniformly sized pixels.

It is another object of the present invention to provide a compact rotating polygon type scanning mechanism that does not require special corrective lenses to expose a line of evenly spaced pixels on a photosensitive member.

It is a further object of the present invention to provide a method of modulating and focusing the exposing light beam of a rotating polygon type image forming apparatus to correct for geometry errors, facet errors, scan bow, smile error, polygon wobble error, and scan line timing jitter.

These and other objects are achieved by forming control marks on a rotating surface of a polygon member or on a rotating surface of a motor polygon assembly, reading the control marks with a reader as the polygon member rotates, and modulating, focusing, and deflecting the exposing light beam in accordance with data read from the control marks. Among other things, the control marks can include:

(1) pixel clock information for controlling the modulation timing of the exposing light beam;

(2) intensity information and smile error correction information for modulating the intensity of the exposing light beam to correct for varying spot velocity and varying reflectivity of different polygon facets;

(3) motor control information for controlling the rotating speed of the polygon member; and (4) facet error information for correcting various imperfections in the polygon member and the geometry of the optics.

The control marks can be formed as a continuous data tracks on a rotating surface of the polygon member or the motor polygon assembly so that they may be conveniently read by an adjacent reader as the polygon member rotates. A scanning apparatus equipped with control marks according to the present invention does not require specially designed corrective lenses, special light beam modulation circuits, or a second pilot light beam and precision grating to expose an evenly spaced, uniformly sized line of pixels on a photosensitive member. In addition, the rotational speed of the polygon member need not be carefully controlled, and no start of scan or end of scan detectors and associated electronics are required. As a result, an image forming apparatus according to the present invention is less complex, less expensive, and is capable of correcting for a variety of polygon manufacturing errors, scanner geometry errors, and optical misalignment errors.

As shown in FIG. 1B, the specially designed F-Theta projection lens set can be replaced with a single simple focusing lens 40. Because the simple focusing lens 40 does not require built in distortion, the lens can be located closer to the polygon member 20. In addition, because the exposing light beam is not being bent towards the center of the photosensitive member by F-Theta lenses when scanning across the edges of the photosensitive member 50, the geometry of the scanner allows the same size scan line to be exposed at a distance closer to the polygon member 20. As a result of the above mentioned factors, the scanning system can be more physically compact, and can utilize less expensive, lenses. Finally, because the simple focusing lens 40 can be located closer to the polygon member 20, a smaller lens aperture is sufficient to pass all the light flux of the exposure beam at maximum scan angles. As a result, the diameter of the lenses used to focus the exposure beam into a line of pixels on the photosensitive member can be smaller, in the direction into/out of the page as shown in FIGS. 1A–1B, without exposure loss due to vignetting as the scan exposes pixels at the edges of the photosensitive member.

The invention will now be described in detail with reference to specific preferred embodiments thereof, it being understood that these examples are intended to be illustrative only, and the invention is not

BRIEF DESCRIPTION OF THE DRAWINGS

The description will make reference to the following drawing figures wherein like elements are identified with like reference numbers, and wherein:

FIGS. 1A–1B are diagrams of the basic elements of a rotating polygon type image forming apparatus;

FIGS. 6A–6B are sectional views of a two-piece optical reader according to the present invention;

FIGS. 7A–7B are sectional views of a one-piece optical reader according to the present invention;

DETAILED DESCRIPTION OF PREFERRED EMBODIMENTS

Figure 2C:
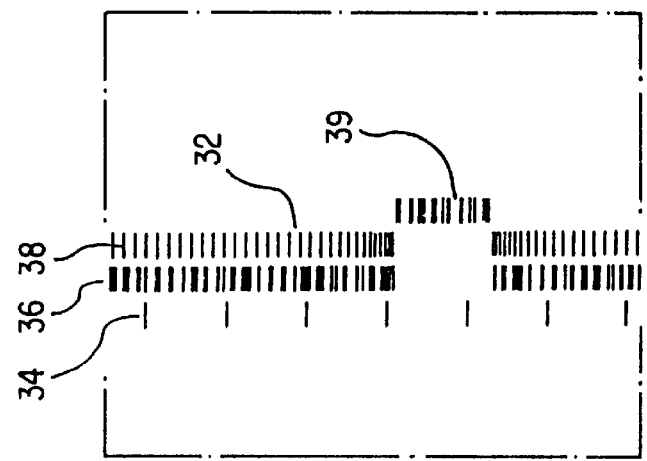
FIGS. 2A–2C are diagrams showing a rotating polygon member having control marks, and an optical reader for reading the control marks.
Figure 2B:
Figure 2A:
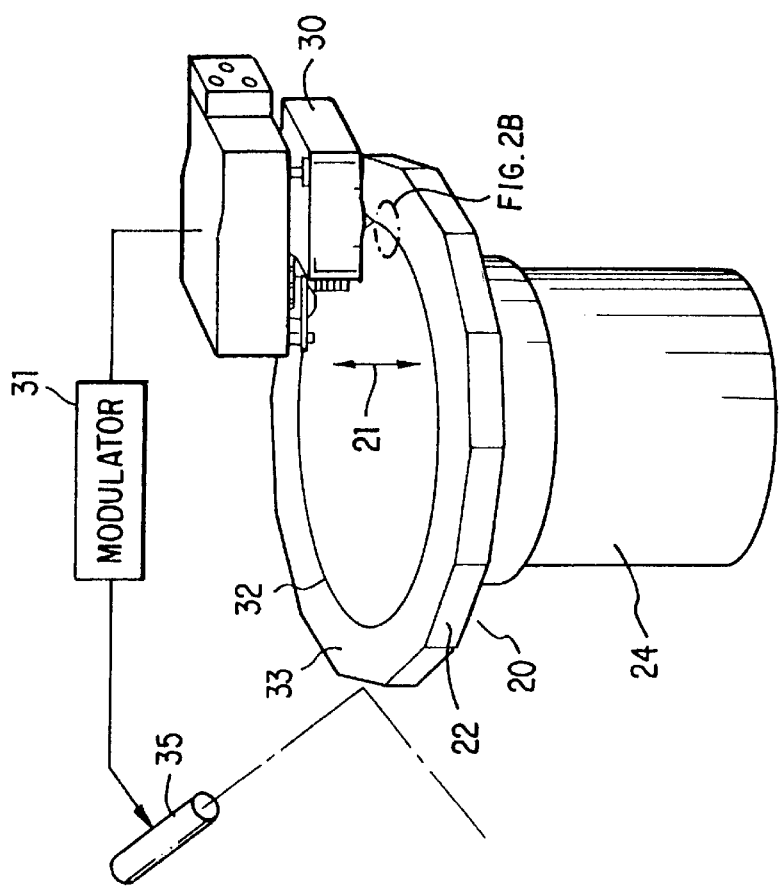

FIG. 2A shows a diagram of a multi-faceted rotating polygon member 20 having a band of coaxial control marks 32 forming a circular ring on a top surface 33 of the polygon member 20. A reader 30 for reading the control marks 32 as the polygon member 20 rotates is located over the surface portion 33 having the control marks 32. The information read from the control marks 32 is provided to a modulator 31 that controls a light source 35. The light source 35 provides a modulated exposing light beam that is reflected from the facets 22 of the polygon member 20 and focussed by projection optics to expose line of pixels on a photosensitive member.

An enlarged view of a portion of the control marks 32 is shown in FIG. 2B. A further enlargement of a portion of the control marks 32 is shown in FIG. 2C. The control marks 32 may include plural data tracks 34, 36, 38 and 39. Each of the data tracks may provide a different type of information used to modulate and otherwise condition the exposing light beam of the image forming apparatus, as well as control related electrical system functions that must be carried out periodically in synchronism with the rotation of the polygon member 20.

The control marks 32 may be formed as elongated bars or slots to relax the radial positioning requirements of the reader 30. When the control marks 32 are formed as elongated bars oriented parallel to the radial direction of the polygon member, the system performance will be relatively insensitive to small radial misalignments of the reader 30 with respect to the position of the control marks 32 on polygon member 20.

With reference of FIG. 2C, data track 34 comprises data used for motor control purposes. The motor control data track 34 consists of evenly spaced control marks continuously extending around the top surface 33 of the polygon member 20. The motor control data track can be used to accurately sense the rotating speed of the polygon member 20 so that the motor driving the polygon member 20 can be regulated to maintain a constant rotational velocity, or to provide an optimized acceleration or deceleration speed profile. The control marks of data track 34 can be closely spaced so that the resulting output signal is equivalent to the output of a high resolution incremental rotary encoder. Alternatively, the marks can be more widely spaced so that the resulting signal can replace the Hall effect output in a typical brushless DC motor.

Data track 36 comprises error correction information. The error correction data track 36 can be used to modulate the intensity of the light beam along the scan line to correct for smile exposure error and to compensate for small differences in the reflectivity of the individual facets 22 of the polygon member 20.

Data track 38 comprises data used to generate a corrected pixel clock signal for each facet of the polygon member. The pixel clock signal data track provides information on the exact timing of each pixel along the scan line and is used to modulate the exposing light beam of the scanning apparatus in precise increments to expose evenly spaced pixels on a photosensitive member.

As best seen in FIG. 2B, each continuous segment of the pixel clock data track 38 is associated with an individual scan line formed by a facet. When the polygon member 20 rotates, each facet, in turn, deflects the exposing light beam through the projection lens to form a scan line on the photosensitive member.

As best seen in FIG. 2C, the periodic gaps between the continuous segments of the pixel clock data track 38 represent the unusable portion of the scan cycle when the exposing light beam is split, reflecting from two facets 22 of the polygon member 20 at the same time. During this period, referred to as the "overscan" portion of the scan cycle, or the "flyback" time (borrowed from video raster nomenclature), full exposure cannot be delivered to either component of the split beam. This time can, however, be put to good use for laser calibration and other off-line functions under the control of data track 39.

In FIG. 2C, it can be seen that the spacing between individual control marks of the pixel clock data track 38 is smaller at the beginning and the end of each continuous segment. This is in accordance with the need to modulate the exposing beam more rapidly at the beginning and end of each scan line (i.e., at the edges of the photosensitive member) in order to expose evenly spaced pixels along the scan line. The variable spacing of the pixel clock control marks provides a very simple method of providing a variable frequency pixel clock signal tailored to compensate for any inherent geometric nonlinearity in the scanning mechanism. This simplifies both the optical and electronic requirements, thereby reducing system costs.

The data tracks 32 can be formed in a rotating surface portion of the polygon member or the motor polygon assembly 24 at the time of manufacture and assembly, or any time thereafter. If the data tracks 32 are formed after the motor polygon assembly has been constructed, the marks can take manufacturing and alignment errors into account. In such a system, the facet errors of each individual facet 22 can also be encoded in the error correction data tracks 32, and the unique facet errors of each facet 22 can be corrected through appropriate modulation and compensation mechanisms. Facet errors include a varying amount of reflectivity of the facet 22, and imperfections in the facet surface which can be corrected by a combination of optical mechanisms or by varying the intensity of the exposing light beam.

Data track 39 can be a general "housekeeping" data track containing indexes, calibrations, timing sequences, and data used on a per scan basis, including facet cone error information about each facet 22 of the polygon member 20. The data in this track is best stored as sequences of binary coded digital words that are arranged according to some predetermined format. If data track 39 includes facet error information, for example, the data string for each particular facet representing measured facet cone angle error would be decoded from data track 39 immediately prior to the scan. Cone angle error could be stored in units of 0.1 micron scan line displacement, so that a range of ±5 mils would require only an 8 bit binary digital word for encoding. Since there is typically room for several thousand such bits along track 39 within the space allotted each facet, many words of data, each representing a multiplicity of functions, could be encoded comfortably in the available space of track 39. This also allows unique errors of individual facets 22 of the polygon member 20 to be processed in real time during the scan.

For example, the encoded 8-bit binary word representing cone error for a given facet might control a digital beam deflector based on optically birefringent elements. Alternatively, the decoded word could control the voltage output of a digital-to-analog converter driving a piezoelectric mirror that deflects the light path of the scanner by an appropriate amount to counteract the displacements caused by polygon facet cone error. Should the need arise, similar deflection mechanisms could be employed to differentially deflect the optical path during the active portion of the scan thereby reorienting or skewing as well as displacing the scan line.

It will be understood by those familiar with the art that the encoded data units on any track are not limited in length to 8 bits, but can be formatted in words, bit groups, or strings of arbitrary size with the various functions they represent arranged in any arbitrary order. Thus, for example, the actual cone angle could be positioned in a 16 bit data word as the eleventh encoded item in the data sequence for each facet, immediately following a 9 bit data word indicating another parameter for the same facet, such as leading edge timing jitter. By representing a scan line displacement range of ±5 mils with a 16-bit binary coded word, instead of the 8-bit word in the previous example, the resolution of the stored data is enhanced by a factor of 8 bits, or 256 times, reducing the basic measurement unit for scan line displacement to 0.0038 microns.

It will also be understood by those familiar with the art that additional data tracks can be included for special purposes. For example, a fifth and sixth data track could be used where it is desired to have three distinct interchangeable printing resolutions such as 600, 750, and 1125 pixels per inch that can be selected electronically. In this case there would be three separate pixel clock data tracks, and the scanning system would select the appropriate data tracks to provide the pixel clock signal. Because the details of each data track can be independently tailored, in addition to different resolutions, each track could be tailored to produce scan lines with different margins and lengths, which would be a useful feature in an electronic printing apparatus used with both foreign and domestic standard paper sizes.

In one preferred embodiment, the control marks 32 have a reflectivity which is different from the reflectivity of the surrounding surface portion 33 of the polygon member 20. The reflectivity of the surrounding surface portion 33 may be higher than the reflectivity of the control marks 32, or the reflectivity of the control marks 32 could be higher than the reflectivity of the surrounding surface portion 33 of the polygon member 20. In such a system the control marks can be read by an optical reader that senses the relative light intensity reflected from the portion of the polygon member having the control marks.

In an alternate embodiment the control marks could consist of narrow zones of differing optical polarization of the linear or circular type. In such a system the control marks can be read by an optical reader that analyzes the relative light intensity returned from the different polarization zones or measures the optical rotation imparted to polarized light incident on the surface portion of the polygon member having the control marks.

In yet another embodiment the control marks could comprise information magnetically encoded in a surface portion of the polygon member. In such a system, a magnetic reader could be used to read the control marks from the polygon member.

Figure 15:
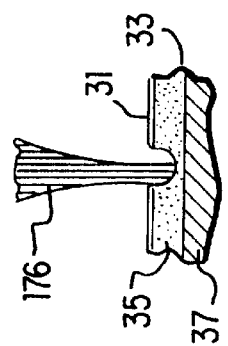
FIG. 15 is a sectional view of a multi-layer surface portion of a rotating polygon member.

A surface portion of a polygon member utilizing varying reflectivity control marks is shown in FIG. 15. Layer 37 is the underlying material of the polygon member. A low reflectivity or light absorbing layer 35 is formed over the material 37 of the polygon member. A layer 31, having a high degree of reflectivity is then formed over the low reflectivity layer 35. A control mark can be formed by removing a section of the highly reflective layer 31 using a laser beam 176. This would result in the control mark having a reflectivity that is lower than the surrounding surface portion 31, which has a high reflectivity. This is analogous to the marks formed in typical compact discs to record data for audio, video, and computer applications.

When control marks 32 of low reflectivity, as described above, is used in an image forming apparatus of the present invention, an optical reader 30 for reading the control marks can have a relatively simple construction. The optical reader 30 would operate in a manner similar to an optical reader of a typical compact disc system. In the typical compact disc system, the marks are formed in a spiral pattern on the surface of the compact disc, and the optical reader is designed to track the spiral pattern of marks as the disc rotates. In the present invention, however, the control marks are formed in circular rings coaxial with the rotational axis of the polygon member. Because there is no need to track a spiral pattern of marks over an extended range, as in a compact disc system, an optical reader for the present invention does not require a complex tracking mechanism.

When polygon members 20 are fabricated, the top surface 33 is typically machined to be extremely flat, thus essentially eliminating runout. The top surface will not deviate more than a few microns in the direction perpendicular to the top surface 33 as the polygon member 20 rotates. As a result, when the control marks 32 are formed on the top surface 33, an optical reader for the control marks does not require the complex dynamic focusing mechanism needed to track the relatively large runout typical of thin polymer compact discs as they rotate in a compact disc system. Because there is no need to track a spiral data track, and because there is very little runout, an optical reader for a polygon member can be more robust and much less expensive than the reader for compact discs.

An optical reader 30 according to the present invention generates an array of light beams focused on the surface portion 33 of the polygon member 20 having control marks. When a light beam illuminates a portion of the surface of the polygon member between control marks, the light flux is reflected back into the optical reader 30 and illuminates a photo detector. When an incident light beam strikes a control mark, the light is absorbed and scattered by the low reflectivity of the control mark, and very little light flux is reflected back into the optical reader 30. As the polygon member 20 rotates, and the control marks pass underneath the optical reader 30, the light beams generated by the optical reader 30 will alternately be specularly reflected from the reflective portions of surface 33 between control marks 32, or the light beams will be absorbed or dispersed by the much less reflective control marks 32.

In a system as shown in FIGS. 2A–2C, a certain separation distance (in the direction of arrows 21) between the optical reader 30 and the surface 33 of the polygon member 20 must be maintained so that the optical reader 30 remains sharply focused on the control marks 32. If the separation distance becomes too small, or too large, the optical reader 30 will be out of focus with respect to the control marks 32, and the pixel clock and correction information provided by the optical reader 30 will be corrupted.

When the control marks are formed in the top surface 33 of the polygon member 20, and the optical reader 30 is rigidly mounted on the scanning apparatus, axial movement of the polygon member 20, along the axis of rotation of the polygon member 20 (shown by arrows 21) will alter the separation distance between the fixed optical reader 30 and the control marks 32, thereby causing the optical reader 30 to lose focus on the control marks 32.

One simple way of solving the focus problem caused by axial movement of the rotating polygon member 20 is to locate the control marks on a cylindrical surface of the rotating polygon member 20 that is coaxial with the rotational axis of the polygon member 20. Polygon members having control marks 32 located on a cylindrical surface portion coaxial with the axis of rotation are shown in FIGS. 3 and 4.

Figure 3:
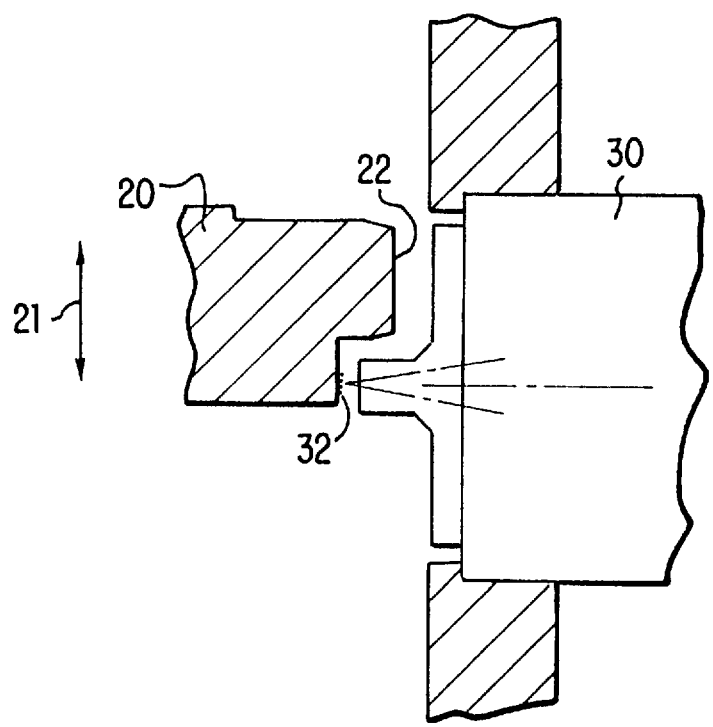
FIG. 3 shows a portion of a rotating polygon member wherein control marks are located on a cylindrical surface coaxial with the rotational axis of the polygon member.

In the system shown in FIG. 3, the control marks 32 are formed on a cylindrical outside edge of the rotating polygon member 20. The control marks 32 are formed directly beneath (or above) the facets 22 of the polygon member 20. The optical reader 30 is located adjacent the control marks 32. Displacement of the polygon member 20 in the axial direction, as indicated by arrows 21, will not alter the separation distance between the optical reader 30 and the control marks 32. Accordingly, the optical reader's focus on the control marks 32 is not affected by axial movement of the polygon member 20. In addition, if the control marks are formed as long thin marks, as shown in FIG. 2C, and the length direction of the control marks is oriented parallel to the axial direction, small displacements of the polygon member 20 in the axial direction of arrows 21, will not cause the optical reader 30 to become misaligned with the control marks 32.

Figure 4:
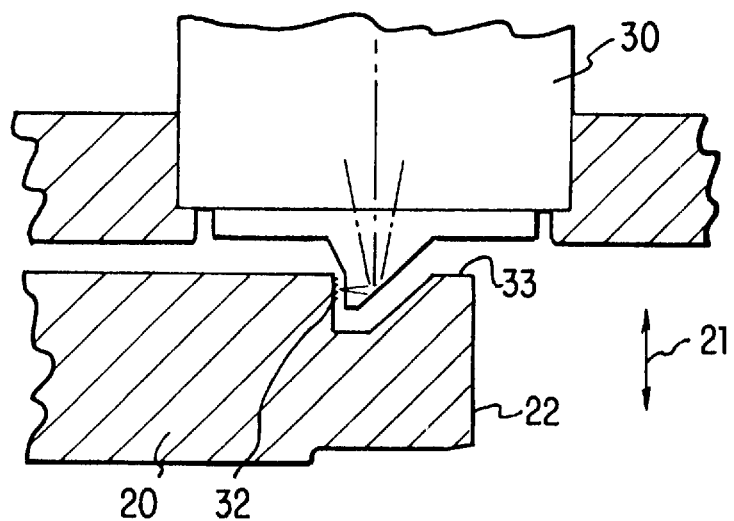
FIG. 4 shows another embodiment of a rotating polygon member wherein control marks are located on a surface coaxial with the rotational axis of the polygon member.

An alternate embodiment of a rotating polygon member 20 that has control marks on a cylindrical surface coaxial with the rotational axis is shown in FIG. 4. In this embodiment, the control marks 32 are formed in the side wall of a trench formed in the top (or bottom) surface 33 of the polygon member 20. As described above, movement of the polygon member 20 in the axial direction, as indicated by arrows 21, will not cause the separation distance between the optical reader 30 and the control marks 32 to vary, and will not cause the optical reader 30 to become misaligned with long thin control marks 32.

The control marks could also be formed on a rotating surface portion of the motor polygon assembly. The rotating surface portion of the motor polygon assembly could be oriented perpendicular to the axis of rotation of the polygon member, or it could be a cylindrical surface that is coaxial with the axis of rotation.

Figure 5C:
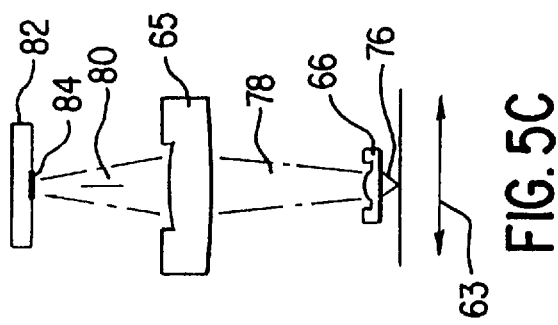
FIGS. 5A–5C are diagrams showing the basic elements of an optical reader of the present invention used to read control marks on a rotating polygon member.
Figure 5B:
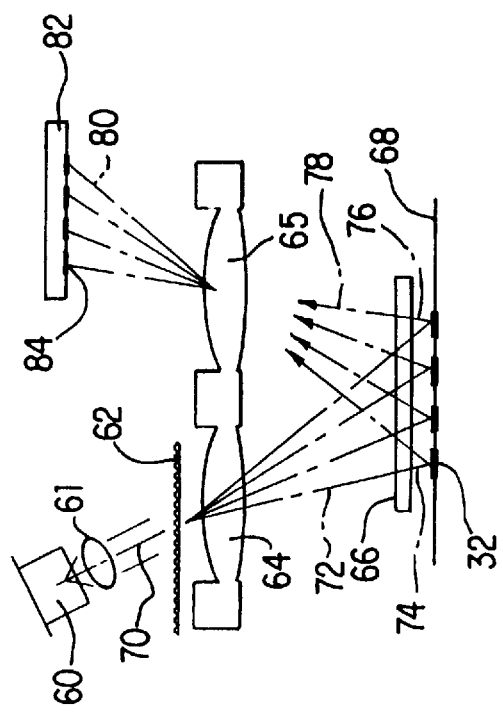

The individual elements of a typical optical reader suitable for use in the present invention are shown in FIG. 5B. In this embodiment the optical reader is designed to simultaneously illuminate and read four different data tracks of control marks 32. The basic elements of the optical reader may include a light source 60, a collimation lens 61, an optical diffraction grating 62, a first lens 64, a cylindrical lens 66, a second lens 65, and a plurality of photodetectors 84 mounted in a detector assembly 82.

A light beam 70 is generated by the light source 60 and directed towards the control marks 32 on the surface 68 of a polygon member. When the beam 70 passes through the diffraction grating 62, the light flux is separated into four divergent beam paths 72 which pass through the first lens element 64 and are concentrated at the centers of the four data tracks 32. Each of the four light beams 72 pass through a common cylinder lens 66 to form light beams 74 that are focused in a narrow line oriented in the radial direction on the surface portion 68 of the polygon member 20 having data tracks 32.

When the narrowly focussed light beams 74 strike a surface portion 68 of a polygon member between control marks, the light beams 74 are specularly reflected by the surface 68 into light beam paths 76. When the light beams 74 strike control marks 32 on the surface portion 68 of the polygon member, the light beams 74 are absorbed or scattered by the control marks 32, and the light intensity reflected in beam paths 76 is highly attenuated.

The reflected light beams 76 pass back through the cylinder lens assembly 66, and through a second lens element 65 that focuses the reflected light beams on photodetectors 84 mounted in a detector assembly 82.

Figure 5A:
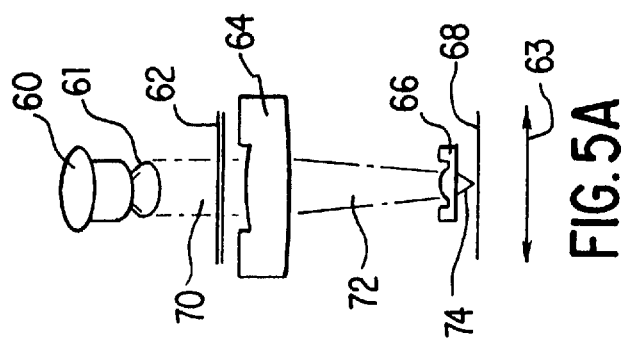

FIG. 5A shows a left side view of the assembly of FIG. 5B. In FIG. 5A the focussing of the light beams 70, 72, and 74 passing through the collimation lens 61, the first lens 64, and the cylinder lens 66 is illustrated.

FIG. 5C is a right side view of the assembly shown in FIG. 5B. FIG. 5C illustrates the reflected light beams 76, 78, and 80, as they are focussed on the photodetectors 84 of the detector assembly 82.

In FIG. 5B, rotation of the polygon member 20 causes the surface portion 68 having control marks 32 to move in a direction normal to the plane of the page (into or out of the page), which is in the direction of the arrows 63 in FIGS. 5A and 5C. In this embodiment, the spacing and width of the data tracks 32, shown in FIG. 5B, can be very much larger than the equivalent dimensions found in typical compact discs because a tightly compressed continuous spiral data track is not needed. In addition to reducing sensitivity to radial misalignments, it will be understood by those skilled in the art that when the control marks 32 are arranged in broad tracks, with wide spacings, the control marks can be sensed with illumination and light collection optics utilizing a low numerical aperture for lenses 64 and 65. The relatively low numerical aperture lenses allows simple separation of the input and output beam paths, as shown in FIG. 5B.

The control marks 32 must be critically positioned on the surface portion 68 with respect to the rotational angle of the facets of the polygon member 20. For accurate positioning of the exposed pixels along the scan line, it is important that the data rate derived from control marks 32 be as high as possible. Cylinder lens 66, in the configuration of FIGS. 5A, 5B, and 5C, satisfies this requirement by providing a high numerical aperture for beam path segments 74 and 76, and hence high optical resolution in the direction of travel of the surface portion 68 of the polygon member.

An optical reader according to the present invention can be mounted in a simple molded optical quality transparent plastic housing. A first embodiment of an optical reader having a two piece housing is shown in FIGS. 6A and 6B. A second embodiment of an optical reader having a one piece housing is shown in FIGS. 7A–7B.

In the first embodiment shown in FIGS. 6A–6B, the housing consists of a first housing section 90, and a second housing section 92. A light source 60 is mounted in the first housing section 90 and a light beam generated by the light source 60 is conditioned by collimation lens 61 and directed towards cylinder lens 66 formed on the bottom of the second housing section 92. A transmission type optical diffraction grating 62, formed on the exit window of the first housing section 90, splits the light beam generated by the light source 60 into plural light beams. The first lens 64 and the cylinder lens 66 in the second housing section 92 focus the light beams on a rotating surface portion having control marks.

The light beams are specularly reflected from the surface portion between control marks, and the reflected light beams pass back through the cylinder lens 66, through a second lens 65 formed in the second housing section 92, then illuminate photodetectors mounted in a detector assembly 82. A left side sectional view of the optical reader is shown in FIG. 6A.

The first housing section 90 can be joined to the second housing section 92 via pins or tongue-in-groove joints that allow the first housing section 90 to be mechanically aligned with the second housing section 92. Projections 94 on the first housing section 90 fit into matching depressions 96 on the second housing section 92. This allows the light source 60, and the detector assembly 82 to be aligned with the optics contained in the second housing section 92.

An alternate one piece embodiment of an optical reader housing is shown in FIGS. 7A and 7B. In this embodiment the housing is made as a single piece of optical quality transparent molded plastic. A light source 60, and conditioning collimation lens 61 mounted in the housing 98, produces a light beam that is directed towards the bottom of the housing. A reflective type optical diffraction grating 62, on the bottom of the housing 98, reflects the light beam and separates the light beam into plural light beams. The plural reflected light beams travel to a first concave mirror 100 on the top of the housing 98 where the plural light beams are reflected towards a cylinder lens 66 formed on the bottom of the housing 98. The concave mirror 100 and cylinder lens 66 focus the light beams onto a rotating surface portion having control marks.

The light beams are specularly reflected from the surface portion between control marks and the reflected light flux passes back through the cylinder lens 66, and towards a second concave mirror 101 on the top of the housing 98. The plural light beams are reflected by the second concave mirror 101 and a plane path-folding mirror 103 on the bottom of the housing 98. The plural light beams reflected from the plane-folding mirror 103 on the bottom of the housing 98 are projected onto the detector assembly 82 and illuminate photodiodes in the detector assembly 82. A sectional side view of the optical reader is shown in FIG. 7A.

In this one piece embodiment, the exposed external surfaces of optical diffraction grating 62, folding mirror 103, and concave reflecting mirrors 100 and 101 can be rendered highly reflective using the mechanism of total internal reflection. Alternatively, when this is geometrically impractical, chemical or vacuum deposition techniques such as sputtered gold or aluminum can be used to make these surfaces reflective to provide maximum light flux throughput, and high optical signal strength.

Those surface portions of the reader assemblies described above not forming part of the optical train can be additionally treated to block stray light using opaque materials and protective coatings common in the optical trade. In the embodiments of the optical reader described above, the light source 60 or the detector assembly 82 could also be adjustably mounted on the housings to allow alignment of the light source 60 and detector assembly 82 with the optical elements. In addition, if the housings are made from optical grade plastic, the lenses, diffraction gratings and mirrors could be integrally formed as a part of the molded housing. The use of segmented prism elements and multifaceted mirror surfaces can also be integrated as part of the optical reader assembly as a substitute for the beam splitting functions provided by the optical gratings 62.

As mentioned above, rotation of a polygon member can result in axial movement of the polygon member, and wobble about the rotational axis of the polygon member. Because wobble of the polygon member adversely affects the scanned exposed image, rotating polygon assemblies are constructed to minimize wobble. On the other hand, in tangentially scanned systems, displacement of the polygon member in the axial direction has no affect on the optical path of the exposing beam, and consequently optical performance is not affected. Accordingly, many rotating polygon assemblies are designed to allow a certain amount of axial movement during operation. In addition, manufacturing tolerances do not necessarily require that all surfaces of a polygon member be machined to the same high precision. This means that even if the polygon member is fixed in the axial direction, as the polygon member rotates, one or more surfaces of the polygon member may not run true relative to a fixed optical reader positioned above the polygon member.

It is essential that the separation distance between the reader and the surface portion having the control marks be maintained within predefined limits so that the optical reader remains focused on the control marks. Maintaining a constant separation distance can be accomplished by holding both the surface portion having control marks and the reader in substantially fixed positions as long as thermal displacements and the runout of the surface portion of the polygon having the control marks is sufficiently small. Alternatively, the correct separation distance can be dynamically maintained by: 1) fixing the polygon member in the axial direction and allowing the reader to track the surface portion having control marks, or 2) holding the reader fixed and allowing the polygon member to track the optical reader.

Rotating polygon members mounted on ball bearings typically maintain a very well defined axial position during rotation. For these types of polygon member assemblies, adjusting the position of the reader at manufacture, or employing a floating reader positioned by an air bearing, allows a substantially constant separation distance to be maintained between the reader and the surface portion having control marks. The air bearing allows the reader to track the surface portion having control marks to account for displacements caused by thermal and other changes, as well as polygon member runout caused by variations in the surface of the polygon member.

Figure 8:
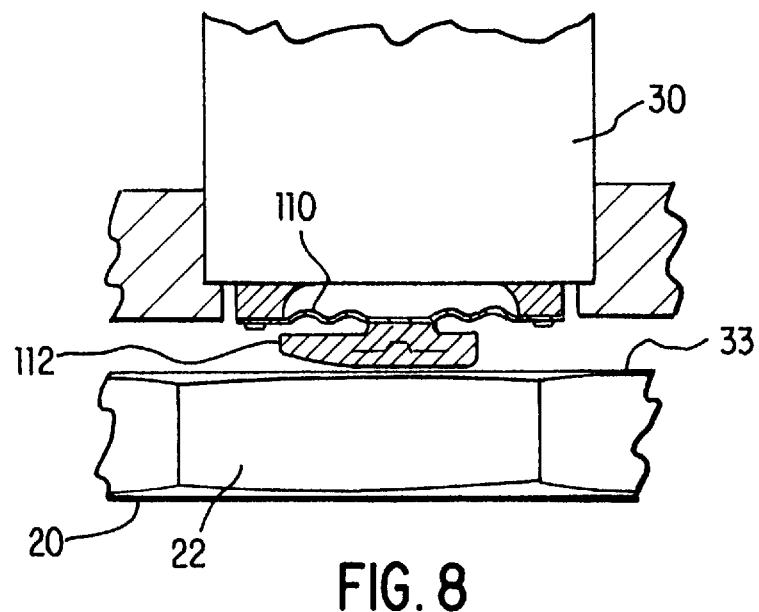
FIG. 8 shows a portion of a rotating polygon member, and a floating optical reader mounted on an air bearing.
Figure 9:
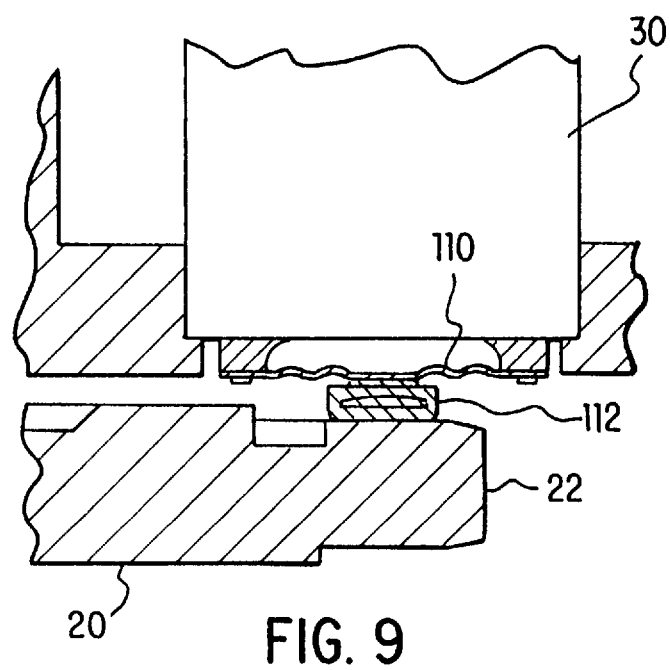
FIG. 9 shows a portion of a rotating polygon member, and a floating optical reader mounted on an air bearing.

An embodiment of a floating reader mounted on an air bearing is shown in FIG. 8. The reader 30 has a floating element 112 that is mounted on a flexible diaphragm 110. The floating element 112 is constructed so that as the polygon member 20 rotates, the floating element 112 glides above the surface 33 of the polygon member 20, at a predefined separation distance, on a thin cushion of air. This type of reader, which employs a dynamic air bearing to define the separation distance, is often used in computer disk drives where a magnetic reading head glides in very close proximity (without contact) over a rotating magnetically encoded disk. The same system is shown from a different angle in FIG. 9.

Some polygon member assemblies, however, employ rotating polygon members mounted on air bearings that are relatively free to move in the axial direction during rotation. This type of polygon member assembly may require an alternate means to maintain a substantially constant separation between the reader and the polygon member.

Figure 10:
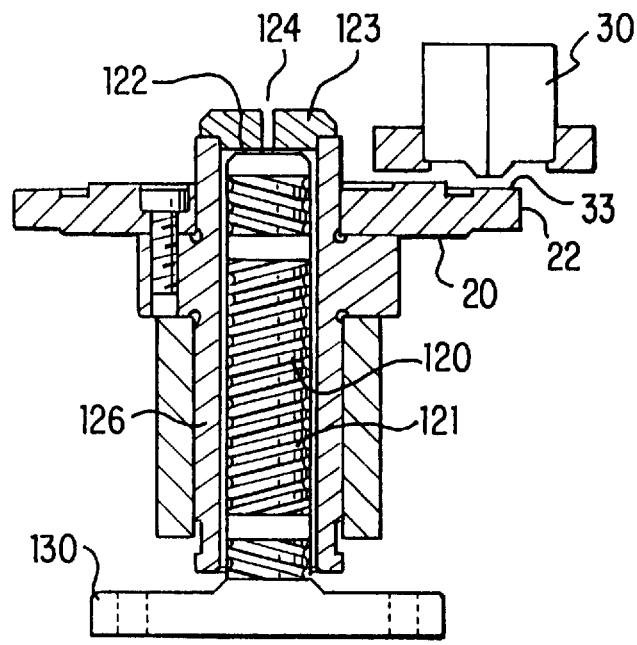
FIG. 10 is a sectional view of a rotating polygon member assembly wherein the polygon member is mounted on an air bearing.

One embodiment of a rotating polygon member mounted on an air bearing is shown in the sectional view of FIG. 10. This assembly includes a base 130, a fixed spindle 120, and a closely fitted sleeve 126 surrounding the spindle 120. The rotating polygon member 20 is mounted on the sleeve 126. Spiral grooves 121 are formed in the spindle 120 so that rotation of the closely fitted sleeve 126 about the spindle 120 causes air to be pumped axially by grooves 121. The air pumped along the spindle 120 enters through the open bottom of the assembly, and escapes through a vent hole 124 at the top of the assembly. The pumped air acts as a cushion that centers the sleeve 126 around the spindle 120, and supports the weight of the rotating assembly, thereby maintaining the polygon member in a relatively fixed axial position during rotation. The top of the assembly acts as a thrust type air bearing comprised of the top of the spindle 122, and the top 123 of the rotating polygon assembly. The vent hole 124 in the top 123 of the rotating polygon assembly regulates the air pressure within the end cavity to maintain the polygon member in a relatively fixed axial position.

In a polygon assembly having a fixed reader, and control marks formed in a substantially flat surface portion with negligible axial runout, a self-regulating thrust bearing of the type shown at the top of the assembly in FIG. 10 may be sufficient to keep the polygon member in a substantially fixed axial position so that a substantially constant separation distance may be maintained between the reader and the polygon member.

Figure 13:
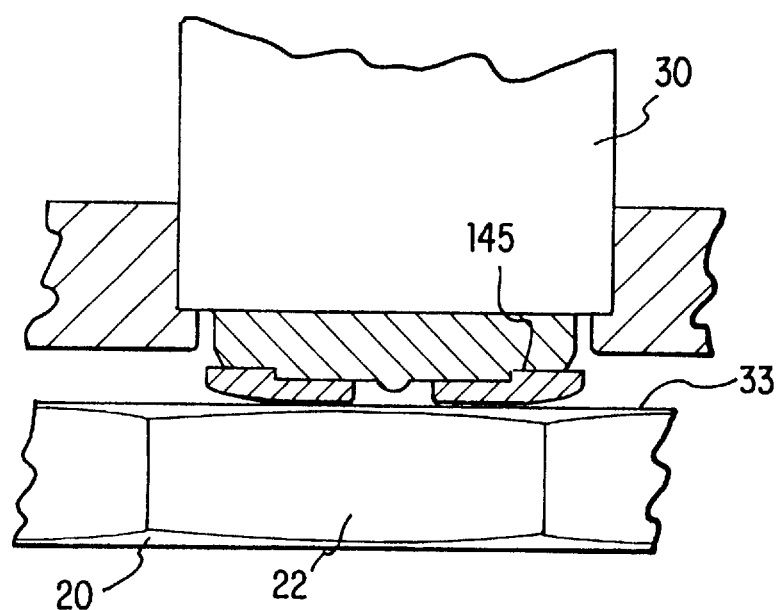
FIG. 13 shows a fixed optical reader and a portion of a floating rotating polygon member whose axial position is controlled by an air bearing.

Alternately, a dynamic type air bearing may be provided to define the axial position of the polygon member during rotation to maintain the substantially constant separation distance. FIG. 13 shows a fixed reader 30 incorporating a dynamic air bearing shoe that controls the axial position of the polygon member 20 to maintain a relatively constant separation distance between the fixed reader 30 and the top surface 33 of the polygon member 20. In operation, a small external axial force is applied to the polygon member 20 to drive it against the air bearing shoe 145. Rotation of the polygon member 20 causes an air cushion to form between the air bearing shoe 145 and the top surface 33 of the polygon member 20. The air cushion applies an axial force to the top surface 33 of the polygon member 20 that balances the externally applied axial force so that a relatively fixed axial operating position is established that provides a constant separation distance between the reader 30, and the top surface 33 of the polygon member 20.

An alternate method of controlling the axial position of a rotating polygon member, which may be used in conjunction with an air bearing as described above, is shown in FIG. 11. In this embodiment, a circular positioning magnet 141 is mounted adjacent a C-shaped extension 143 of rotating sleeve 126 A fixed reader head 30, incorporating a dynamic air bearing shoe 145, is mounted in the motor housing. The C-shaped extension 143 is designed so that lines of magnetic flux apply axial forces to the rotating sleeve that are balanced when the C-shaped extension 143 straddles the centering magnet 141. The assembly can be configured so that the centering magnet applies a slight upward force to the polygon member that is opposed by a downward force applied to the top surface 33 of the polygon member 20 by an air cushion from the air bearing shoe 145. In this manner, a constant separation distance may be maintained.

Figure 11:
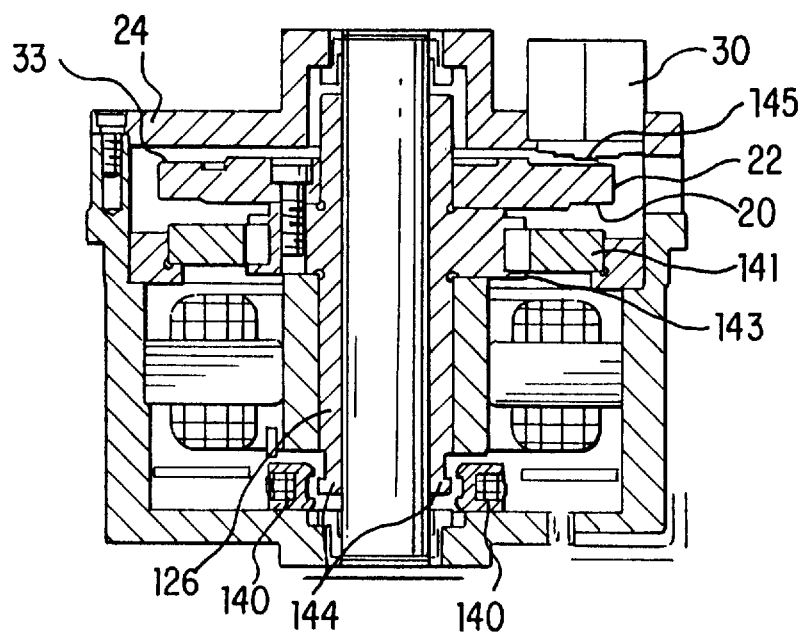
FIG. 11 is a sectional view of a rotating polygon member assembly that includes a centering magnet and dynamic positioning coils.

Additionally, the rotating polygon assembly may incorporate positioning coils to control the axial position of the polygon member. With further reference to FIG. 11, in these types of rotating polygon assemblies, a positioning coil 140 is mounted adjacent a protruding ring or lip 144 formed on the rotating sleeve 126. An electrical current is applied to the positioning coil 140 to create a magnetic field which can be varied in strength by varying the electrical current applied to the positioning coil. The magnetic field flux produced by the positioning coil 140 applies an axial force on the lip 144 of rotating sleeve 126 which tends to cause the lip to be centered on the positioning coil 140. The axial force is adjustable by changing the current level applied to positioning coil 140.

A positioning coil 140 may be mounted in the assembly so that it is slightly above the normal axial position of the protruding lip 144 on rotating sleeve 126. Applying a current to the positioning coil 140 will then apply a slight upward force to the rotating sleeve 126 as the protruding lip 144 is drawn toward the center of the C-shaped portion of the positioning coil 140.

Alternately, one positioning coil 140 may be mounted slightly higher than the normal axial position of a protruding lip 144, and another positioning coil 140 may be mounted slightly lower than the typical axial position of a protruding lip 144. The protruding lips can be different protruding lips, or a common protruding lip can be acted upon by two separate positioning coils, one mounted slightly higher and the other slightly lower than the typical axial position of the common protruding lip 144. In this assembly a positioning current may be selectively applied to one of the two positioning coils, or to both coils in varying proportions, to selectively apply an upward or downward force to the rotating sleeve 126.

A centering magnet 141, and positioning coils 140, could also be used together in several ways to control the axial position of the polygon member. In the case where a fixed air bearing shoe is used in combination with a magnetically suspended polygon assembly, the positioning coil could be used to cause the polygon member to engage the air bearing only after the full rotational operating speed has been achieved. The positioning coil could also cause the polygon member to disengage the air bearing before shutting down in order to avoid excessive wear at low speeds.

In another configuration, in which air bearing shoes are not needed, the ability to apply upward or downward forces to the rotating polygon member using positioning coils allows the axial position of the rotating assembly to be controlled by an electronic feedback loop. In this configuration, the rotating polygon member is actively repositioned by means of the axial forces supplied by the positioning coils dependent on the focal condition the reader, and the position of the surface portion having the control marks.

Figure 12:
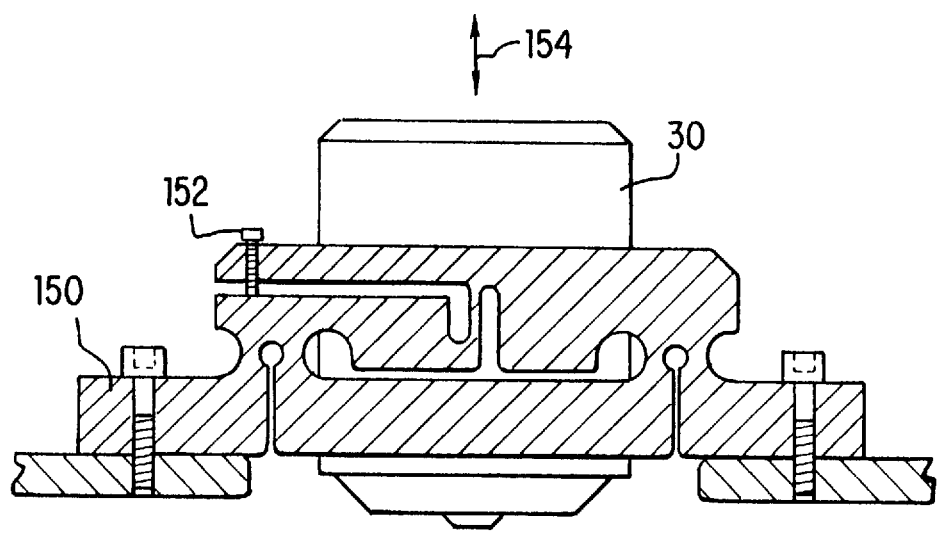
FIG. 12 shows an optical reader mounted on a flex hinge linkage.

Another mechanism for adjusting the position of the optical reader relative to the polygon member is shown FIG. 12. In this mechanism, reader 30 is mounted on a flex hinge assembly 150. The flex hinge 150 allows fine adjustments of the position of the reader 30. By turning the adjustment screw 152 of the flex hinge assembly 150, the reader 30 can be adjusted upwards and downwards in very small displacements. Once a polygon member and a reader are mounted in a rotating polygon assembly, the flex hinge assembly 150 could be used to carefully adjust the separation distance between the reader 30 and the surface portion having control marks.

Figure 14:
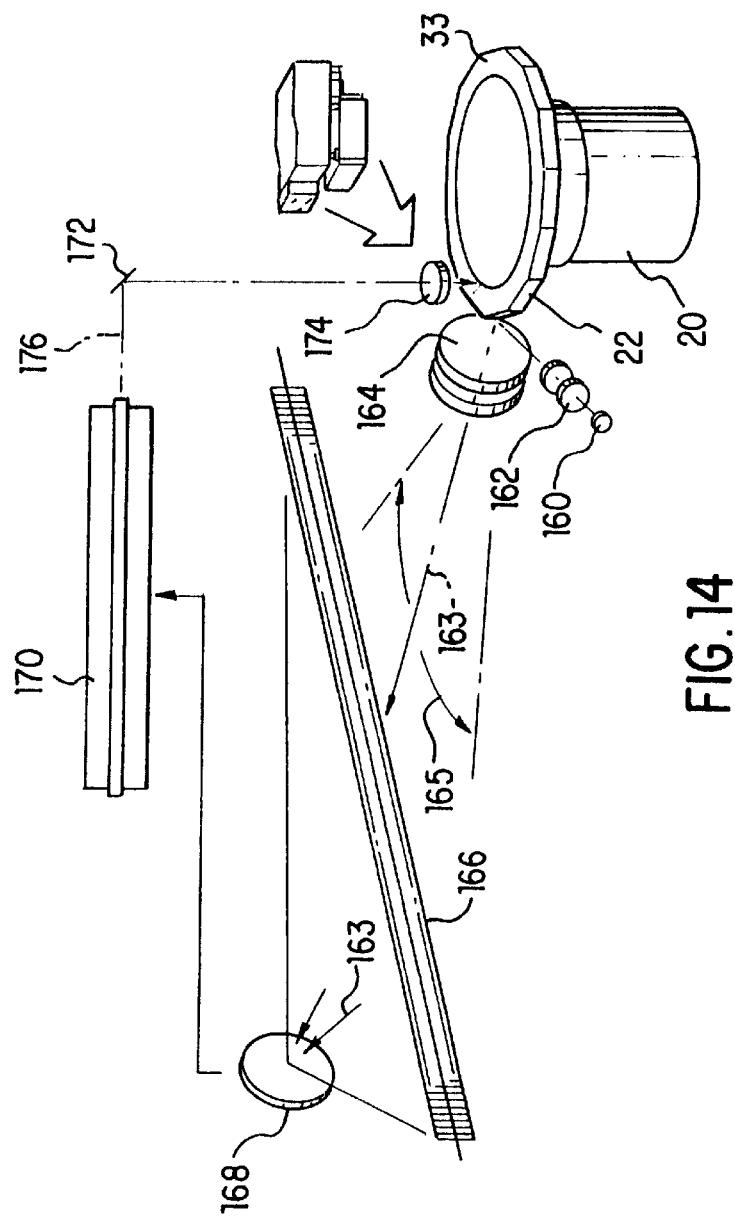
FIG. 14 is a diagram showing an apparatus used to form control marks on a rotating polygon member.

A marking fixture for forming control marks on a surface portion of a rotating polygon member is shown in FIG. 14.

The marking fixture can be used to form control marks on a polygon member 20 in situ, after assembly of the basic scanning apparatus. The basic scanning apparatus includes the exposing light beam generator 160, beam collimation elements 162, and beam projection lens elements 164. In the marking fixture of FIG. 14, control marks are made on a polygon member 20 in response to the same light beam 163 that will be used for exposing the photosensitive member in the finished image forming apparatus.

Unmodulated light originating from the exposing light beam generator 160 is collimated by the beam conditioning optics 162, and reflected from the facets 22 of the rotating polygon member 20. The reflected light beam 163 is focussed by projection lens 164 to form an unmodulated scan line on a calibrated optical scale or grating 166. The grating 166 consists of a pattern of precisely spaced alternating transparent and opaque elements. As the polygon member 20 rotates, the focussed beam 163 projected by the lens elements 164 onto the surface of the precision grating 166 scans lengthwise across the grating surface as indicated by arrows 165. Light flux from the focussed beam 163 that is interrupted by the evenly spaced opaque zones of the precision grating 166 is prevented from reaching a photodetector 168. Light flux from the focused beam that impinges on a transparent portion of the grating 166 will pass through the grating 166 and illuminate the photodetector 168.

Each time the light beam is interrupted by an opaque zone on grating 166, the light flux falling on photodetector 168 is momentarily reduced in intensity. The response of photodetector 168 to the periodic amplitude modulation of the incident light flux is used to generate a marking signal that is applied to the marking laser assembly 170. Because the geometry of the scanning optical system will cause the focussed light beam 163 to scan across the ends of grating 166 at a faster surface speed than at the center of the diffraction grating 166, the frequency at which the light beam 163 is modulated onto the photodetector 168 will vary. Accordingly, the marking signal provided to the marking laser assembly 170 will have a variable frequency. By employing all the active elements of the polygon optical train in their final configuration for generating a scan line, manufacturing and assembly alignment errors of the optical elements, the scan line nonlinearity due to geometry errors, as well as all other factors that affect the position of pixels along the scan line will be compensated.

It will be understood by those skilled in the art that the output of photodetector 168 can be used directly to generate a one-to-one marking signal, wherein one control mark is made on the surface 33 of the rotating polygon member 20 each time the beam 163 is interrupted by an opaque element of the grating 166. Alternatively, using straightforward electronic pulse manipulation circuitry, one mark can be made for each N interruptions of the beam 163 by the grating 166, wherein N is any integer number. It is also possible to generate a proportional pulse train using, for example, phase locked loop techniques, such that M evenly spaced marks are made on the surface 33 of rotating polygon member 20 for each individual interruption of the beam 163 by the grating 166, wherein M is an integer or ratio of integers. Thus the marks made on the surface 33 of the rotating polygon member 20 need not be restricted to a one-to-one relationship with respect to the pulses generated from the output of the photodetector 168. This means that the same marking fixture can be used to calibrate a range of rotating polygon imaging systems without requiring separate precision gratings 166 tailored for each specific marking system resolution.

It will also be understood by those of skill in the art that the pulse multiplication and dividing techniques described above can be applied equally well to generating a pixel clock signal based on the control marks read from the rotating polygon member 20. This allows the scanning apparatus to generate various pixel imaging resolutions in the field that have relationships of N or M to the spacing of the control marks.

The marking laser assembly 170 generates a modulated marking laser beam in response to the signal from the photodetector 168. The beam marking laser beam is oriented by a steering mirror 172, and passes through a focusing lens 174 which concentrates the laser power on a surface portion 33 of the polygon member 20 to form control marks. The focussing lens 174 may include, as part of the focussing lens train, the second lens 65 as well as the cylinder lens 66 of the optical readers shown in FIGS. 5B, 5C and 6B, or the equivalent reflective concave mirror 101 and path-folding mirror 103 shown in FIG. 7B. In both cases, the reader is mounted on the polygon assembly and the photodetector array is temporarily removed. The marking beam is directed through the output port of the reader so that it is focused on the surface of the polygon member by the optics in the reader assembly.

As described above, and as shown in FIG. 15, the marking laser beam can form a control mark by ablating away, or otherwise modifying, a localized portion of a highly reflective layer 31 to expose an attenuating or less reflective layer 35. In addition, the laser beam can be shaped and focused to form control marks having a thin elongated shape.

If the polygon member is made to rotate at a constant angular velocity, the variable frequency marking signal provided by photodetector 168, and the pulse manipulation network, to the marking laser assembly 170 will cause the control marks to be formed in the surface of the polygon member with variable spacing. As described above, this variable spacing exactly compensates for the geometrical and alignment factors that would ordinarily produce a scan line with uneven pixel spacings. This allows a reader of the control marks to generate a variable frequency pixel clock signal that can be used to expose a scan line of evenly spaced pixels.

The photodetector 168 can also be designed to detect the intensity of the light beam 163 received at the photodetector. The intensity information can be used to create an intensity correction signal, which is suitably encoded and also provided to the marking laser assembly 170. The marking laser assembly 170 can then use the intensity correction signal in combination with a reorientation of steering mirror 172, to form a track of intensity control marks at the appropriate radial position on the top surface 33 of the polygon member 20.

The photodetector 168 could also comprise an array of photodetectors that sense positional focus errors and scan line displacement or wobble caused by imperfections in the facets 22 of the polygon member 20. The photodetector 168 could then provide an encoded polygon cone angle and focus error signal to the marking laser assembly 170, which is used with the beam steering mirror 172, to form appropriate control marks for the correction of polygon cone error displacement and focus error on the polygon member 20.

It will be clear that to those skilled in the art that because the control marks on the rotating surface portion are in a fixed relationship to the reflecting facets 22 of the polygon member 20, the nominal position and spacing of pixels exposed on a photosensitive member with a polygon type image forming apparatus prepared according to the present invention will be independent of the actual rotational speed of the polygon member. As a result, the marking or calibration process described above, and shown in FIG. 14, can take place at a different rotational speed than the intended operating speed of the image forming apparatus.

While the invention has been described in relation to specific preferred embodiments, it will be evident to those skilled in the art that many alternatives, modifications and variations of the invention are possible. Accordingly, the application is intended to embrace all such alternatives, modifications and variations as fall within the spirit and broad scope of the appended claims.

What is claimed is:

1. A modulation signal generator for a rotating polygon image forming apparatus, comprising:
    a multifaceted rotating polygon member mounted in a motor polygon assembly and rotating about an axis;
    control marks formed on a rotating surface portion of one of the polygon member and the motor polygon assembly;
    reading means located adjacent the rotating surface portion for reading the control marks when the polygon member rotates; and
    a modulation signal generator connected to the reading means for generating a modulation signal based on information read from the control marks, the modulation signal being used to modulate an exposing light beam of the image forming apparatus, the modulated exposing light beam forming an electrostatic latent image on a photosensitive member.

2. The device of claim 1, wherein said rotating surface portion is perpendicular to the rotational axis of the polygon member and wherein the control marks comprise a continuous path on said surface portion at a substantially constant radial distance from the rotational axis of the polygon member.

3. The device of claim 2, wherein the control marks comprise plural data tracks.

4. The device of claim 2, wherein the control marks have a reflectance different from a reflectance of a surrounding surface portion.

5. The device of claim 4, wherein the control marks are formed in a multi-layer surface portion, said multi-layer surface portion comprising:
    a first non-reflective layer; and
    a second reflective layer overlying the first layer;
    wherein portions of the second reflective layer are selectively removed to form control marks that are less reflective than the surrounding surface portion.

6. The device of claim 4, wherein the control marks have a reflectance greater than the surrounding surface portion.

7. The device of claim 4, wherein the control marks have a length and a width, the length being greater than the width; and
    wherein the length of the control marks is aligned substantially parallel with a radial direction of the polygon member.

8. The device of claim 2, wherein the reading means comprises an optical reader for reading the control marks when the polygon member rotates, the optical reader being focused on the rotating surface portion having control marks by a spacer mechanism for varying a separation distance between the optical reader and the rotating surface portion.

9. The device of claim 8, wherein the spacer mechanism comprises a flex hinge, the flex hinge being adjustable to vary the position of at least one of the optical reader and the rotating surface portion having control marks to vary said separation distance.

10. The device of claim 8, wherein the spacer mechanism comprises:
    a positioning controller providing a positioning signal;
    at least one thrust coil connected to the positioning controller and generating a magnetic field in response to the positioning signal; and
    at least one protrusion formed on one of the motor polygon assembly and the polygon member, the at least one protrusion being located adjacent the at least one thrust coil;
    wherein a magnetic field generated by the at least one thrust coil exerts a force on the at least one protrusion when the polygon member is rotating, said force varying the axial position of the rotating surface portion to vary said separation distance, such that said separation distance is controlled by said positioning signal.

11. The device of claim 8, wherein the spacer mechanism comprises:
    positioning means for maintaining a substantially constant separation distance between the optical reader and the rotating surface portion having control marks during rotation of the polygon member.

12. The device of claim 11, wherein the rotating surface portion is substantially fixed in the axial direction during rotation, and wherein the positioning means varies the position of the optical reader to maintain said substantially constant separation distance.

13. The device of claim 12, wherein the positioning means comprises an air bearing, the air bearing controlling the position of the optical reader during rotation of the polygon member to maintain said substantially constant separation distance.

14. The device of claim 11, wherein the optical reader is substantially fixed and wherein the positioning means varies the axial position of the rotating surface portion having control marks to maintain said substantially constant separation distance.

15. The device of claim 14, wherein said positioning means comprises an air bearing, the air bearing controlling the axial position of the rotating surface portion having control marks to maintain said substantially constant separation distance.

16. The device of claim 14, wherein said positioning means comprises an air thrust bearing and a regulating vent, the combination of the air thrust bearing and the regulating vent controlling the axial position of the rotating surface portion having control marks to maintain said substantially constant separation distance.

17. The device of claim 14, wherein said positioning means comprises:
    a positioning controller providing a positioning signal;
    at least one thrust coil connected to the positioning controller and generating a magnetic field in response to the positioning signal; and
    at least one protrusion formed on one of the motor polygon assembly and the polygon member, the at least one protrusion being located adjacent the at least one thrust coil;
    wherein a magnetic field generated by the at least one thrust coil exerts a force on the at least one protrusion when the polygon member is rotating, said force varying the axial position of the rotating surface portion to vary said separation distance such that said separation distance is controlled by said positioning signal.

18. The device of claim 1, wherein the control marks are formed on a rotating cylindrical surface portion of one of the polygon member and the motor polygon assembly, and wherein the cylindrical surface portion is coaxial with the rotational axis of the polygon member.

19. The device of claim 18, wherein the control marks comprise plural data tracks.

20. The device of claim 18, wherein the control marks have a reflectance different from a reflectance of a surrounding cylindrical surface portion.

21. The device of claim 20, wherein the control marks are formed in a multi-layer cylindrical surface portion, said multi-layer cylindrical surface portion comprising:

a first non-reflective layer; and a second reflective layer overlying the first layer;

wherein portions of the second reflective layer are selectively removed to form control marks that are less reflective than the surrounding cylindrical surface portion.

22. The device of claim 20, wherein the control marks have a reflectance greater than the surrounding cylindrical surface portion.

23. The device of claim 18, wherein the control marks have a length and a width, the length being greater than the width; and wherein the length of the control marks is aligned substantially parallel to the rotational axis of the polygon member.

24. The device of claim 18, wherein the reading means comprises an optical reader for reading the control marks when the polygon member rotates, the optical reader being focused on the control marks by a spacer mechanism for varying a separation distance between the optical reader and the rotating cylindrical surface portion having the control marks.

25. The device of claim 24, wherein the spacer mechanism comprises a flex hinge, the flex hinge being adjustable to vary said separation distance.

26. The device of claim 24, wherein the spacer mechanism comprises:

positioning means for maintaining a substantially constant separation distance between the optical reader and the rotating cylindrical surface portion having control marks during rotation of the polygon member.

27. The device of claim 26, wherein the positioning means comprises an air bearing, the air bearing controlling one of the position of the optical reader and the position of the rotating cylindrical surface portion to maintain said substantially constant separation distance.

28. The device of claim 24, wherein the control marks have a length and a width, the length being greater than the width, the length of the control marks being aligned substantially parallel to the rotational axis of the polygon member so that movement of the rotating cylindrical surface portion in the axial direction will not vary said separation distance.

29. The device of claim 1, wherein the control marks comprise pixel clock information for modulating an exposing light beam of the image forming apparatus.

30. The device of claim 29, wherein the control marks comprise plural data tracks of control marks, at least two of said data tracks comprising pixel clock information for modulating an exposing light beam of the image forming apparatus.

31. The device of claim 30, wherein each of said at least two data tracks of control marks comprising pixel clock information provides pixel clock information for exposing a scan line of a different length.

32. The device of claim 30, wherein each of said at least two data tracks of control marks comprising pixel clock information provides pixel clock information for exposing a scan line having a different number of pixels.

33. The device of claim 29, wherein the control marks further comprise motor control information for controlling the rotational speed of the polygon member.

34. The device of claim 29, wherein the control marks further comprise pixel intensity information for modulating the intensity of an exposing light beam of the image forming apparatus.

35. The device of claim 29, wherein the control marks further comprise facet error information for modulating an exposing light beam of the image forming apparatus to correct for facet errors.

36. The device of claim 29, wherein the control marks further comprise smile error information for modulating an exposing light beam of the image forming apparatus to correct for smile error.

37. The device of claim 1, wherein the reading means comprises an optical reader for reading the control marks when the polygon member rotates.

38. The device of claim 37, wherein the optical reader comprises:

a housing;

a light source mounted in the housing for generating a light beam;

optics means mounted in the housing for focusing the generated light beam on the rotating surface portion having control marks when the optical reader is positioned adjacent the rotating surface portion; and detecting means mounted in the housing for detecting light reflected from at least one of the rotating surface portion and the control marks.

39. The device of claim 38, wherein the light source comprises a laser.

40. The device of claim 38, wherein the detecting means comprises at least one photodiode.

41. The device of claim 38, wherein the optics means comprises at least one focusing lens.

42. The device of claim 41, wherein the optics means further comprises at least one mirror for reflecting the light beam.

43. The device of claim 38, wherein said housing comprises a first housing section and a second housing section, the light source and the detecting means being mounted in the first housing section, and at least a portion of the optics means being mounted in the second housing section; and wherein said first housing section is movably attached to said second housing section for alignment of the light source and detecting means with the portion of the optics means mounted in the second housing section.

44. The device of claim 38, wherein the control marks comprise a plurality of data tracks;

wherein the optics means separates the generated light beam into a plurality of light beams and focuses each of the plurality of light beams, respectively, onto an area of the rotating surface portion having a different data track of control marks; and wherein the detecting means comprises a plurality of detectors, each of the plurality of detectors detecting a light beam associated with a different one of the plurality of data tracks.

45. The device of claim 44, wherein the optics means further comprises a diffraction grating for separating the generated light beam into a plurality light beams.

46. The device of claim 38, wherein the light source is positionable in the housing to align the light source with the optics means.

47. The device of claim 38, wherein the detecting means is positionable in the housing to align the detecting means with the optics means.

48. The device of claim 38, wherein the optics means are integrally formed with the housing.

49. A method of generating a modulation signal used to modulate an exposing light beam of a rotating polygon image forming apparatus to form an electrostatic latent image on a photosensitive member, comprising the steps of:

provinding machine readable control marks on a rotating surface portion of one of a polygon member and a motor polygon assembly of an image forming apparatus;

rotating the polygon member;

reading the control marks on said rotating surface portion as the polygon member rotates; and generating a modulation signal based on information read from the control marks.

50. The method of claim 49, further comprising the steps of:

reading plural data tracks of control marks as the polygon member rotates; and generating at least one modulation signal based on the information read from the plural data tracks of control marks.

51. The method of claim 49, further comprising the step of controlling the position of said rotating surface portion relative to a reader to focus the reader on the control marks on said rotating surface portion.

52. The method of claim 49, further comprising the step of controlling the position of a reader relative to said rotating surface portion to focus the reader on the control marks on said rotating surface portion.

53. The method of claim 49, further comprising the step of controlling a separation distance between the rotating surface portion having the control marks and a reader to focus the reader on the control marks.

* * * * *